United States Patent
Mazzarelli

[19]

[11] Patent Number: 5,997,071
[45] Date of Patent: Dec. 7, 1999

[54] PROTECTIVE COVER SECURED BY DIFFERENTIAL PRESSURE

[75] Inventor: Samuel G. Mazzarelli, Goshen, Conn.

[73] Assignee: Commercial Sewing, Inc., Torrington, Conn.

[21] Appl. No.: 08/324,927

[22] Filed: Oct. 18, 1994

[51] Int. Cl.⁶ .................................................. B60J 11/00
[52] U.S. Cl. ........................ 296/136; 150/166; 224/328
[58] Field of Search ........................... 296/136; 150/159, 150/166, 167; 52/3, 2.16; 224/328

[56] References Cited

U.S. PATENT DOCUMENTS

| | | |
|---|---|---|
| 2,536,152 | 1/1951 | Bass . |
| 3,968,913 | 7/1976 | Weed et al. . |
| 4,009,744 | 3/1977 | Joslyn . |
| 4,261,401 | 4/1981 | Hickey . |
| 4,598,725 | 7/1986 | Brewer . |
| 4,668,007 | 5/1987 | Sloan ............................... 296/180.4 X |
| 4,715,646 | 12/1987 | Goffi et al. . |
| 4,763,783 | 8/1988 | Talbot ........................................ 52/3 X |
| 4,938,522 | 7/1990 | Herron et al. ........................... 296/136 |
| 4,944,340 | 7/1990 | Tortorich . |
| 4,976,389 | 12/1990 | McLellan et al. . |
| 5,282,502 | 2/1994 | Ballard ................................ 269/136 X |
| 5,291,698 | 3/1994 | Rayner, Jr. ...................................... 52/3 |
| 5,291,848 | 3/1994 | Wilhelm et al. . |

FOREIGN PATENT DOCUMENTS

| | | | |
|---|---|---|---|
| 2434076 | 4/1980 | France . | |
| 2551705 | 3/1985 | France . | |
| 2543891 | 10/1994 | France ................................... | 296/136 |

*Primary Examiner*—Joesph D. Pape
*Attorney, Agent, or Firm*—Pepe & Hazard LLP

[57] ABSTRACT

A protective cover for an object being transported in an airstream comprises a flexible cover member adapted to cover the object. The cover has front and rear ends, a top, two sides, and a bottom providing an opening to fit over the object. The cover member also has at least one exhaust aperture intermediate its ends with a venting member disposed over it. The bottom of the cover member is seated around the periphery of the object to reduce the airflow thereinto. The venting member has a base portion secured to the cover member about the aperture, and a body portion extending outwardly therefrom. The body portion has a closed end oriented towards the front end of the cover member and an open end disposed toward the rear end of the cover member. The body portion also provides a passage from the aperture to the open end, whereby negative air pressure is created at the open end by the flow of the airstream over the venting member and air is exhausted from the interior of the cover to cause the cover to seat snugly about the surface of the object about which it is fitted.

21 Claims, 3 Drawing Sheets

5,997,071

1

PROTECTIVE COVER SECURED BY DIFFERENTIAL PRESSURE

BACKGROUND OF THE INVENTION

The present invention relates to covers for protecting cargo being transported by motor vehicles.

Covers are widely employed to protect valuable cargo such as boats and other personal watercraft, snowmobiles and bicycles from the elements of weather and from wind blown debris. At highway speeds, the air flow has a tendency to blow the cover off the cargo. As a result, tie down devices such as straps and buckles have been employed to secure the cover over the cargo. Moreover, the cover has a tendency to whip and buffet as a result of the air flow about the cover particularly when a high speed air stream flows under the cover. This whipping and buffeting can cause the cover to tear and even damage the cargo underneath it. Moreover, the whipping and buffeting of the cover generates considerable noise.

More recently, McLellan U. S. Pat. No. 4,976,389 proposed a cover to protect a bicycle from exposure to environmental conditions during transport, and it employs a single aperture at its rear end to create a suction effect on air under the cover to inhibit undesired buffeting of the cover. This suction effect is created by a pressure drop occurring at the aperture which is the result of difference in air pressure between the interior and the exterior of the cover.

Although the McLellan cover may reduce the buffeting associated with conventional bike covers which fit closely about the bicycle, the type of structure has limited applicability to devices other than bicycles which have relatively narrow profiles.

Accordingly, it is an object of the present invention to provide a novel cover for articles being transported which is effective to cause the cover to fit relatively closely about the article at transport speeds.

It is also an object to provide such a cover which is relatively free from whipping and buffeting at transport speeds.

Still another object is to provide such a cover which may be readily and economically fabricated for a large variety of cargoes such as personal watercraft, snowmobiles and boats.

A further object is to provide a novel method for covering objects being transported in an air stream.

SUMMARY OF THE INVENTION

It has now been found that the foregoing and related objects may be readily attained in a protective cover for an object being transported in an airstream which includes a flexible cover member adapted to cover the object. The cover has front and rear ends, a top, two sides, and a bottom providing an opening to fit over the object. The bottom of the cover member is seated around the periphery of the object to reduce the airflow thereinto.

The cover member has at least one exhaust aperture intermediate its end with a venting member disposed over it. The venting member has a base portion secured to the cover member about the aperture, and a body portion extending outwardly therefrom. The body portion has a closed end oriented towards the front end of the cover member and an open end disposed toward the rear end of the cover member. The body portion provides a passage from the aperture to the open end, whereby negative air pressure is created at the open end by the flow of the airstream over the venting member and air is exhausted from the interior of the cover

2 member to cause the cover member to seat snugly about the surface of the object about which it is fitted.

Preferably, the body portion of the venting member has a configuration which approximates that of an axial segment of a cone and has an arcuate cross section. The base portion of the venting member is an outwardly extending flange which is sewn to the cover member. It is elongated and has its longitudinal axis oriented at an angle of between 30° and 60° to the longitudinal axis of the cover member. The venting member is generally fabricated from synthetic resin.

Desirably, the cover member is substantially impermeable to air. The cover member material is most conveniently either a woven fabric with a synthetic resin coating or is woven of synthetic resin thread.

Generally, the bottom of the cover member is adapted to conform the cover member substantially about the periphery of the associated object.

Preferably, each of the sides of the cover has at least one exhaust aperture and a venting member is disposed over each of the exhaust apertures.

DETAILED DESCRIPTION OF THE PREFERRED EMBODIMENT

Figure 1:
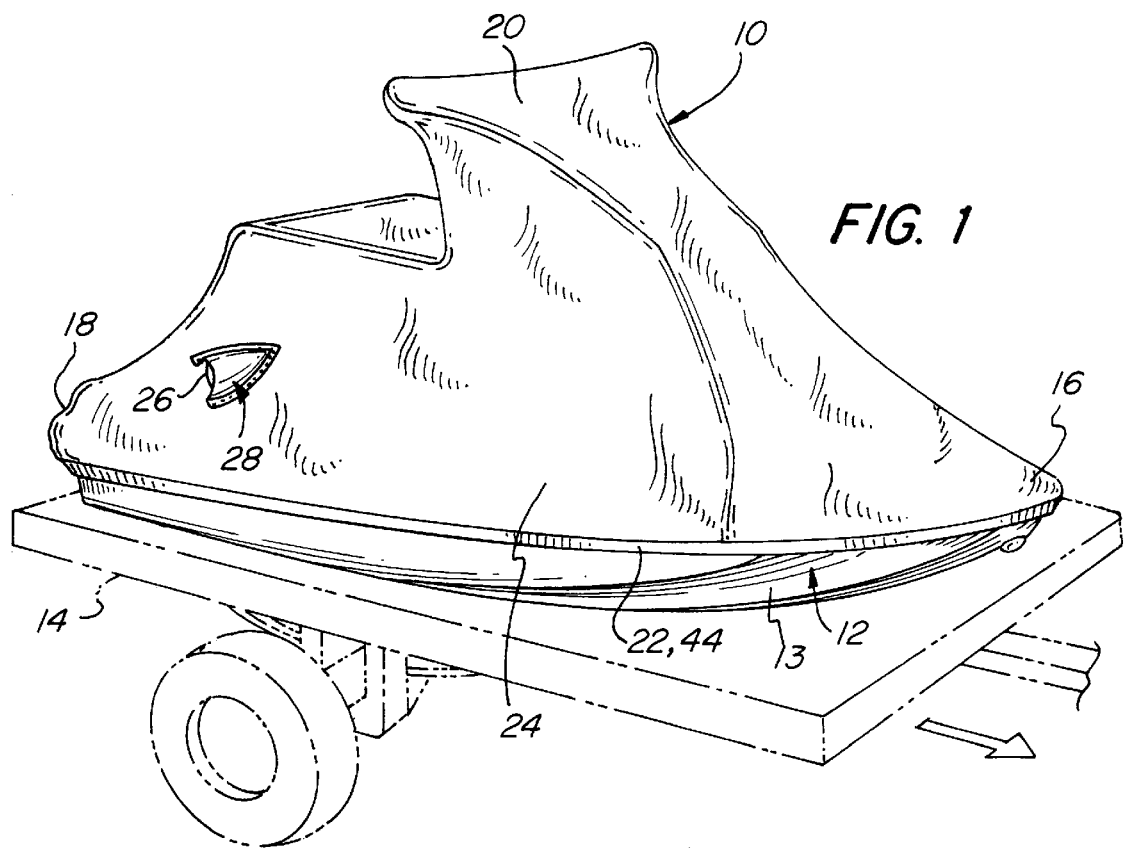
FIG. 1 is a front perspective view of a cover embodying the present invention as secured about a water jet watercraft on a trailer.

Turning first to FIG. 1, therein illustrated is a protective cover embodying the present invention, generally designated by the numeral 10, covering a water jet watercraft generally designated by the numeral 12. The watercraft 12 is being transported on a trailer 14 shown in phantom line in the direction of travel indicated by the arrow in FIG. 1 by a vehicle (not shown).

The cover 10 is made of a flexible, air impermeable material which is dimensioned and configured to conform closely to the exterior contours of the watercraft 12. The cover 10 has a bottom 22 which defines an opening large enough to fit over the hull 13 of the watercraft 12. The bottom 22 of the cover 10 is fitted to and secured about the periphery of the hull 13 of the watercraft 12 by securing means such as an elasticized band 44 about the bottom edge.

The cover 10 has a front end 16 which is disposed forwardly in relation to the direction of travel, a rear end 18, a top 20, and sides 24. As the watercraft 12 is transported on the trailer 14, air flows over the cover 10 opposite the direction of travel from the front end 16 to the rear end 18. On each side 24 is a vent generally designated by the numeral 28.

Figure 2:
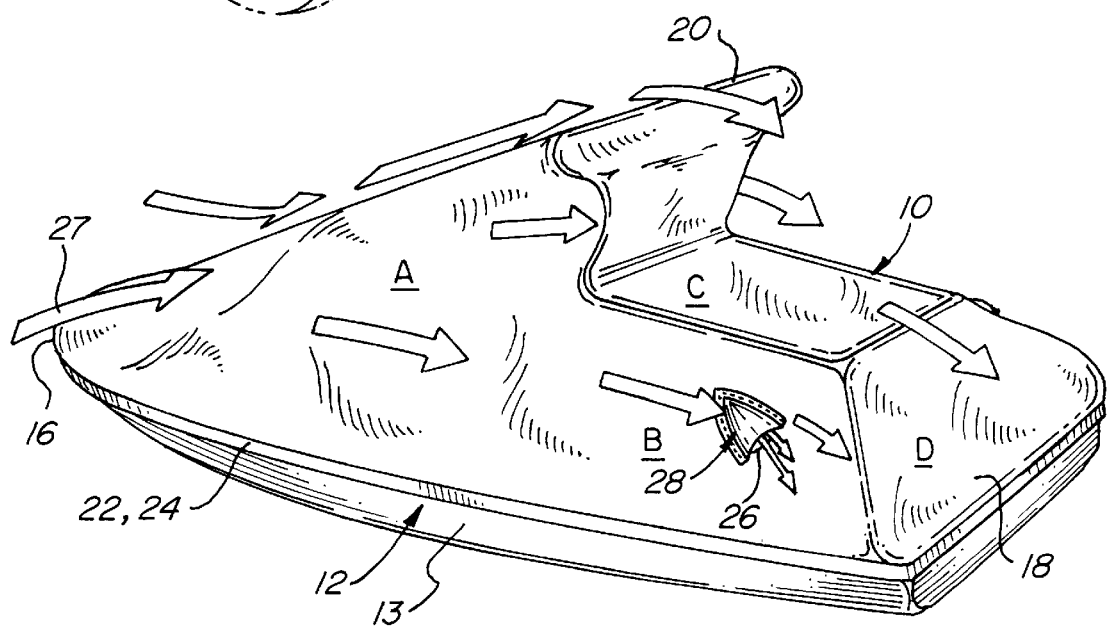
FIG. 2 is a rear perspective view of the covered watercraft and showing diagrammatically the airflow.
Figure 3:
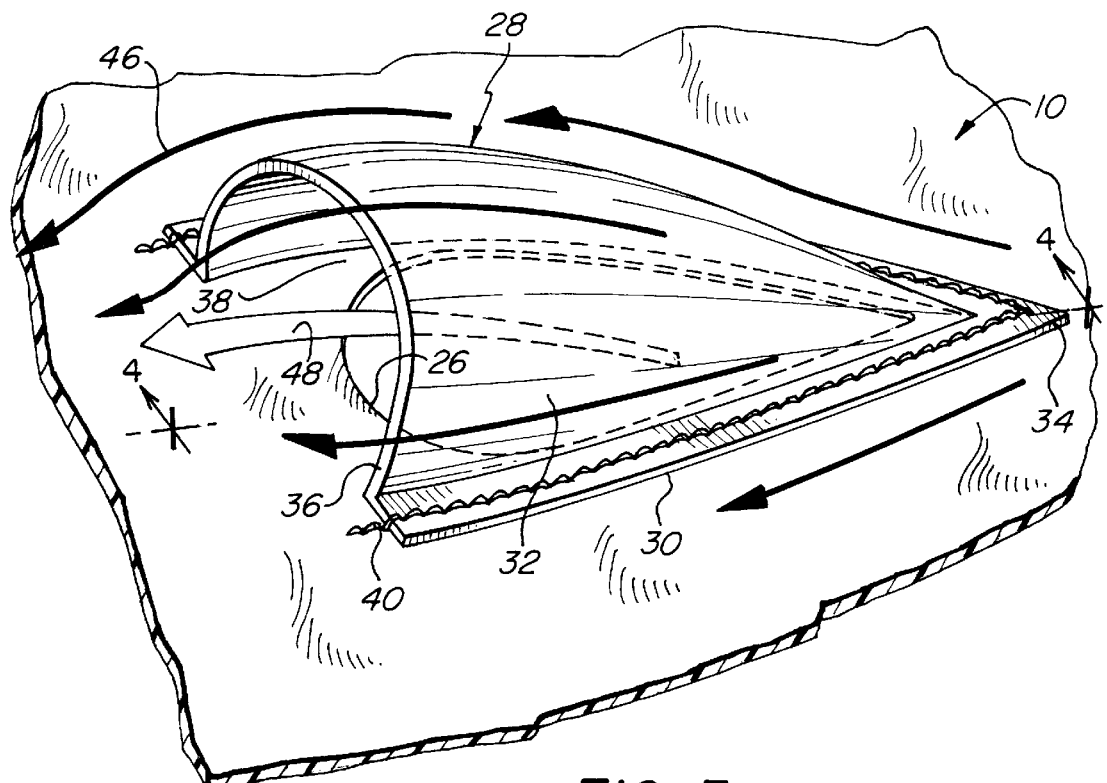
FIG. 3 is a fragmentary perspective view of the venting member and cover drawn to an enlarged scale and showing diagrammatically the air flow.
Figure 4:
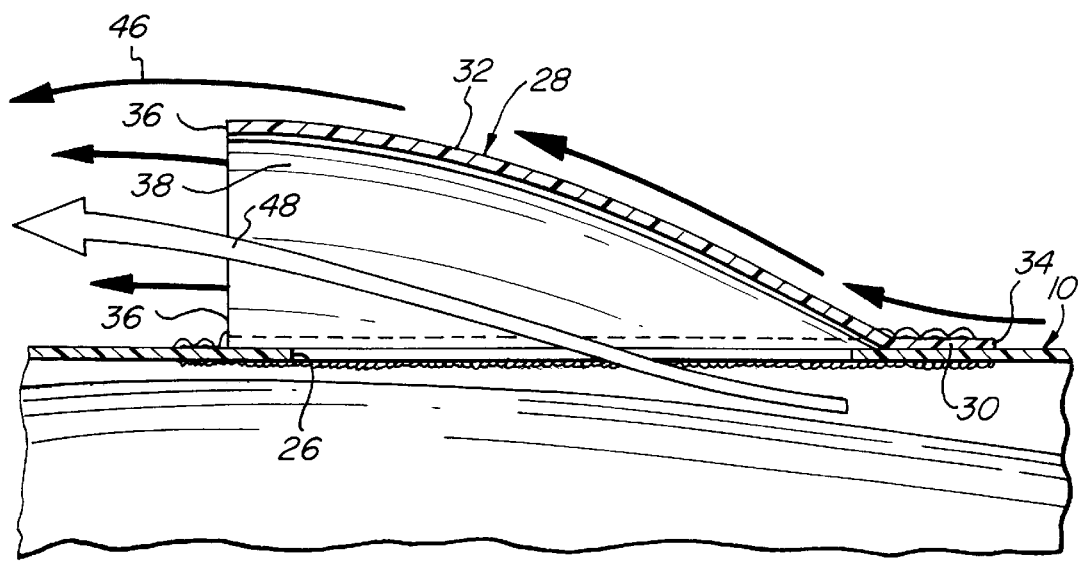
FIG. 4 is a sectional view of the venting member and cover along the line 4—4 of FIG. 3.

As best seen in FIGS. 3 and 4, each vent 28 is disposed over an exhaust aperture 26 in the cover 10. Turning next to FIG. 2, the vent 28 and exhaust aperture 26 are located on the side 24 of the cover 10 in areas (designated by the letters A & B) of smooth air flow (as illustrated by arrows 27). The vent 28 and exhaust aperture 26 are much less effective if they are located on the rear end 18 of the cover in areas (designated by the letters C & D) of turbulent air flow.

In the preferred embodiments, an equal number of exhaust apertures 26 and vents 28 are located on both sides 24 of the cover 10. The shape of the exhaust aperture 26 desirably conforms to the vent 28 which is secured thereover.

The vent 28 has a base portion 30 in the form of an outwardly extending flange and a body portion 32 of arcuate cross section which extends outwardly from the base 30. As best seen in FIG. 3, the vent 28 is sewn by thread 40 to the exterior of the cover 10 about the exhaust aperture 26. The body portion 32 of the vent 28 preferably has an elongated, streamlined configuration which approximates an axial segment of a cone. Therefore, the shape of the base portion 30 depends on how the cone is sliced and is either generally parabolic, hyperbolic or "V" shaped.

The body portion 32 has a closed end 34 disposed towards the front end 16 of the cover and an open end 36 disposed towards the rear end 18 of the cover 10, and it provides a passage 38 from the exhaust aperture 26 to the open end 36. In the preferred embodiment, the longitudinal axis of the elongated vent 28 is oriented at an angle of between 30 degrees and 60 degrees to the longitudinal axis of the cover 10.

When the watercraft 12 is being transported, a smooth stream of air passes over the vent 28 (as illustrated by the solid arrows 46 in FIGS. 3 and 4) and the streamlined shape of the vent 28 creates negative air pressure in the area of the open end 36. This negative air pressure induces air to exhaust from under the cover 10 through the exhaust aperture 26 (as illustrated by the unshaded arrow 48 in FIGS. 3 and 4), causing the cover 10 to conform closely to the surface of the watercraft 12, and significantly inhibiting buffeting.

With conventional covers, forces which cause buffeting thereof increase with vehicle speed. In the covers of the present invention, however, the negative air pressure within the cover which inhibits buffeting also increases with vehicle speed and counteract the increasing buffeting forces in the areas of turbulent flow to keep the cover 10 tightly conforming to the peripheral surface of the watercraft 12. As the speed of the airflow increases with the vehicle speed, the pressure differential at the vent 28 increases, inducing more air to exhaust and the cover 10 to conform more tightly to the surface of the watercraft 12.

As will be appreciated, the vent 28 may have alternate configurations including generally cylindrical and spherical to permit relatively smooth air flow thereover to similarly create negative pressure and induce air to exhaust from the exhaust aperture 26.

Figure 5:
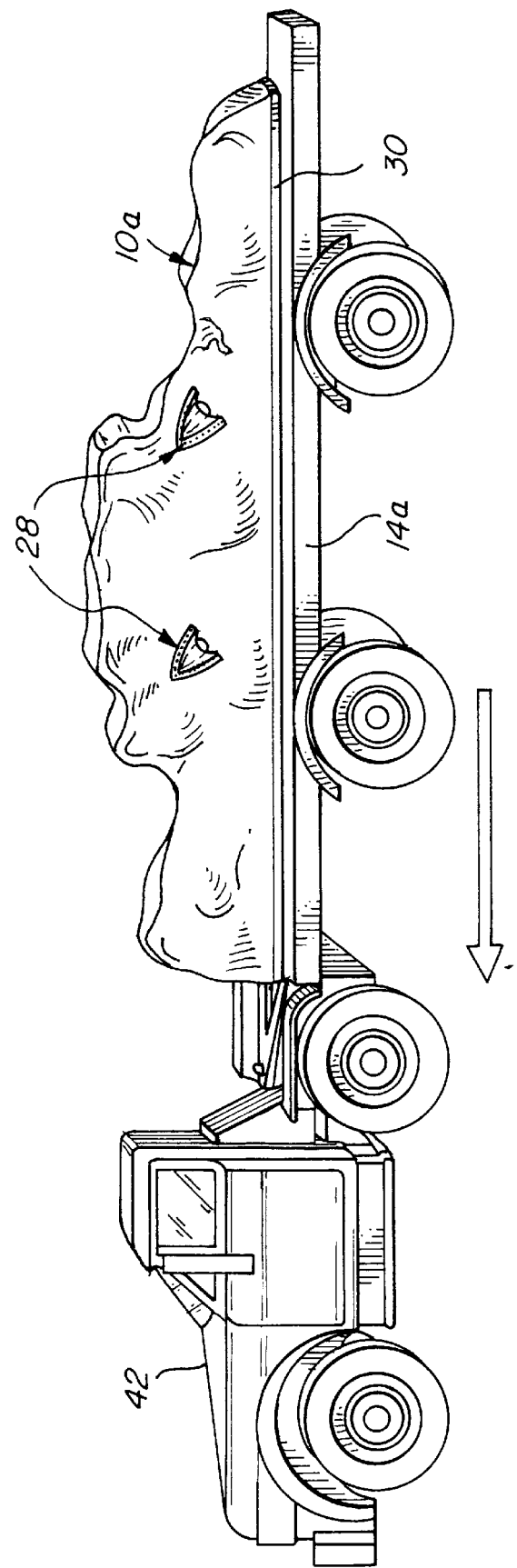
FIG. 5 is a perspective view of another embodiment of the present invention placed over a more elongated cargo on a trailer attached to a cab.

In FIG. 5 another embodiment of cover 10a is shown and effectively covers and conforms to the surface of a nondescript object transported on a trailer 14a being pulled by a vehicle 42 in the direction of travel indicated by the arrow. The object need not have a specific shape like the profile of the watercraft of FIGS. 1 and 2 for the vent 28 to be effective. The placement and shape of the vent 28 itself effectively creates negative air pressure under the cover 10, and only requires that the bottom of the cover be secured reasonably tightly about the object to reduce airflow thereunder and that vents 28 be placed in a smooth stream of air to do so effectively. As further shown in FIG. 5, multiple vents 28 may be attached to the cover 10 on each side to provide sufficient negative air pressure over the length of the cover 10a.

As will be appreciated, various materials may be employed for the construction of the cover. Most conveniently, the cover is made of an air impermeable, woven fabric which is flexible over a wide temperature range to accommodate for the various operating environments in which the cover may be used. Exemplary fabrics include synthetic resins such as 600 denier polyester or 1200 denier polypropylene, with a polyurethane resin coating. Another material which may be used is nylon or polyester film on a cotton scrim.

Similarly, various materials may be employed for the construction of the vent 28. Desirably, the vent 28 will be lightweight and exhibit resiliency over a broad temperature range. Conveniently, the vent 28 is molded from of a synthetic resin such as polypropylene.

As will be further appreciated, the vent 28 may be attached to the cover 10 by means other than sewing by thread 40 which is preferable. Other means of attachment include separate adhesives, heat sealing, and fasteners such as rivets and staples.

It will be appreciated that the operation of the present invention is most effective with covers which conform reasonably closely to the contours of the object about which they are placed, but this is not essential. It is necessary that the bottom of the cover fit closely about the periphery of the object to minimize air flow thereunder into the interior of the cover. Thus, covers with bottom portions which can be drawn tightly about the object are desirable and this can be provided by elasticized edge portions, draw strings, hook and loop fasteners, etc.

In addition, although not normally necessary, it may be desirable to secure the cover on the object by tie downs such as straps which can extend about the bottom of the object so that the cover is secured about the object while it is being lifted or moved.

Thus, it can be seen from the foregoing detailed description and accompanying drawings that the novel protective cover of the present invention is one which effectively fits relatively closely about articles being transported and effectively prevents whipping and buffeting of the cover at transport speeds. The cover may be readily and economically fabricated for a large variety of cargos such as personal watercraft, snowmobiles and boats.

Having thus described the invention, what is claimed is:

1. A protective cover for an object being transported in an airstream comprising:

(a) a unitary flexible cover member of material substantially impermeable to air and dimensioned and configured to cover an associated object being transported in an airstream, said cover member having front and rear ends, a top, two sides and a bottom providing an opening to fit over the associated object, said cover member having at least one exhaust aperture intermediate its ends;

(b) means for seating said bottom of said cover member closely around the periphery of the associated object to reduce the airflow thereinto; and (c) a venting member disposed over said exhaust aperture, said venting member having a base portion secured to said cover member about said aperture and a body portion extending outwardly therefrom, said body portion having a closed end oriented towards said front end of said cover member and having an open end disposed towards said rear end of said cover member, said body portion providing a passage from said aperture to said open end, whereby negative air pressure is created at said open end by the flow of an associated airstream over said venting member and air is exhausted from the interior of the cover member to cause the cover member to seat snugly about the surface of the associated object about which it is fitted.

2. A protective cover according to claim 1 wherein said body portion of said venting member has a arcuate cross section.

3. A protective cover according to claim 2 wherein said body portion of said venting member has a configuration which approximates that of an axial segment of a cone.

4. A protective cover according to claim 1 wherein said base portion is an outwardly extending flange.

5. A protective cover according to claim 4 wherein said base portion is sewn to said cover member.

6. A protective cover according to claim 1 wherein said venting member is fabricated from synthetic resin.

7. A protective cover according to claim 1 wherein said cover member is a woven fabric with a synthetic resin coating.

8. A protective cover according to claim 1 wherein said flexible cover member is woven of synthetic resin thread.

9. A protective cover according to claim 1 wherein said venting member is elongated and has its longitudinal axis oriented at an angle of between 30° and 60° to the longitudinal axis of said cover member.

10. A protective cover according to claim 1 wherein said seating means is adapted to conform said cover member substantially about the periphery of the associated object.

11. A protective cover according to claim 1 wherein each of said sides of said cover member has at least one exhaust aperture and a venting member is disposed over each of said exhaust apertures.

12. A covered object being transported in an airstream comprising:
(a) an object having front and rear ends, a top, a bottom and two sides;
(b) a unitary flexible cover member of material substantially impermeable to air covering said top, sides and ends of said object and having front and rear ends, a top, and two sides which are disposed respectively over the front and rear ends, top and two sides of said object, said cover member having a bottom providing an opening allowing said cover member to fit over said object, said cover member having at least one exhaust aperture intermediate its ends;
(c) seating means about the bottom of said cover member seating said bottom of said cover member closely to the periphery of said object to reduce the airflow thereinto; and
(d) a venting member disposed over said exhaust aperture, said venting member having a base portion secured to said cover member about said aperture and a body portion extending outwardly therefrom, said body portion having a closed end oriented towards said front end of said cover member and having an open end disposed towards said rear end of said cover member, said body portion providing a passage from said aperture to said open end, whereby negative air pressure is created at said open end by the flow of an associated airstream over said venting member and air is exhausted from the interior of the cover member to cause the cover member to seat snugly about the surface of said object.

13. A protective cover according to claim 12 wherein said body portion of said venting member has a arcuate cross section and said base portion of said venting member is an outwardly extending flange.

14. A protective cover according to claim 12 wherein said body portion of said venting member has a configuration which approximates that of an axial segment of a cone.

15. A protective cover according to claim 12 wherein said venting member is elongated and has its longitudinal axis oriented at an angle of between 30° and 60° to the longitudinal axis of said cover member.

16. A protective cover according to claim 12 wherein said cover member is a woven fabric with a synthetic resin coating.

17. In a method for transporting an object on a vehicle travelling in an airstream, the steps comprising:
(a) providing an object to be transported by a vehicle having front and rear ends, a top, a bottom and sides;
(b) covering said object with a unitary cover including (i) a flexible cover member of material substantially impermeable to air having front and rear ends, a top and two sides covering the top, ends and sides of said object, said cover member also having a bottom providing an opening allowing said cover member to fit over said object, said cover member having at least one exhaust aperture intermediate its ends, (ii) a venting member disposed over said exhaust aperture, said venting member having a base portion secured to said cover member about said aperture and a body portion extending outwardly therefrom, said body portion having a closed end oriented towards said front end of said cover member and having an open end disposed toward said rear end of said cover member, said body portion providing a passage from said aperture to said open end, and (iii) securing means about the bottom of said cover member;
(c) securing the bottom of said cover member closely about the periphery of said object to reduce the airflow thereinto;
(d) transporting said covered object on a vehicle at a speed which produces airflow over said cover member and said venting member, thereby creating negative air pressure at said open end of said venting member to cause air to exhaust from the interior of said cover member and causing said cover member to seat snugly about the surface of said object.

18. The method for transporting an object on a vehicle in accordance with claim 17 wherein said step of securing the bottom of said cover member about the periphery of said object to reduce the airflow thereinto includes substantially sealing the bottom of said cover member about the periphery of said object to reduce the airflow thereinto.

19. The method for transporting an object on a vehicle in accordance with claim 17 wherein said covering step includes providing said cover member with a venting member having a body portion with an arcuate cross section and a base portion with an outwardly extending flange.

20. The method for transporting an object on a vehicle in accordance with claim 17 wherein said covering step includes providing said cover member with a venting member which is elongated and has its longitudinal axis oriented at an angle of between 30° and 60° to the longitudinal axis of said cover member.

21. The method for transporting an object on a vehicle in accordance with claim 17 wherein said covering step includes providing a covering member which is a woven fabric with a synthetic resin coating.

* * * * *